US007778482B2

United States Patent
Chen et al.

(10) Patent No.: US 7,778,482 B2
(45) Date of Patent: Aug. 17, 2010

(54) METHOD AND SYSTEM FOR REDUCING MOSQUITO NOISE IN A DIGITAL IMAGE

(75) Inventors: Chun-Wei Chen, Taipei (TW); Jiande Jiang, San Jose, CA (US); Jun Zhang, San Jose, CA (US); Zheng Liu, Sunnyvale, CA (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 974 days.

(21) Appl. No.: 11/489,091

(22) Filed: Jul. 19, 2006

(65) Prior Publication Data

US 2008/0018755 A1  Jan. 24, 2008

(51) Int. Cl.
*G06K 9/40* (2006.01)

(52) U.S. Cl. .................. 382/274; 382/205; 382/261; 382/266; 382/275

(58) Field of Classification Search .............. 382/205, 382/260, 261, 262, 264, 265, 266, 272, 274, 382/275, 308; 396/101; 700/55
See application file for complete search history.

(56) References Cited

U.S. PATENT DOCUMENTS

| | | | |
|---|---|---|---|
| 5,016,104 A * | 5/1991 | Lim | 348/613 |
| 6,721,457 B1 * | 4/2004 | Atkins et al. | 382/260 |
| 7,272,265 B2 * | 9/2007 | Kouri et al. | 382/260 |
| 2003/0083850 A1 * | 5/2003 | Schmidt et al. | 702/189 |
| 2003/0113032 A1 * | 6/2003 | Wang et al. | 382/275 |
| 2003/0223622 A1 * | 12/2003 | Simon et al. | 382/118 |
| 2004/0223659 A1 * | 11/2004 | Minai | 382/262 |
| 2005/0180648 A1 | 8/2005 | Curry et al. | |
| 2006/0050783 A1 * | 3/2006 | Le Dinh et al. | 375/240.2 |

OTHER PUBLICATIONS

PCT/US07/15907 International Search Report dated Feb. 15, 2008.
PCT/07/15907 Written Opinion dated Feb. 15, 2008.

* cited by examiner

*Primary Examiner*—Matthew C Bella
*Assistant Examiner*—Gregory F Cunningham
(74) *Attorney, Agent, or Firm*—DLA Piper LLP (US)

(57) ABSTRACT

A method and system is provided for reducing mosquito noise in a digital image. The method and system receives an input luminance value for a first pixel in the digital image, and determines whether the first pixel is in relative close proximity to an object appearing in the digital image, based on a comparison of the variation between the input luminance value for the first pixel and luminance values of a first plurality of neighboring pixels. If the first pixel is in relative close proximity to an object, the method performs an average filtering of the input luminance value for the first pixel, based on the luminance values of a second plurality of neighboring pixels, to provide a filtered luminance value for the first pixel.

23 Claims, 6 Drawing Sheets

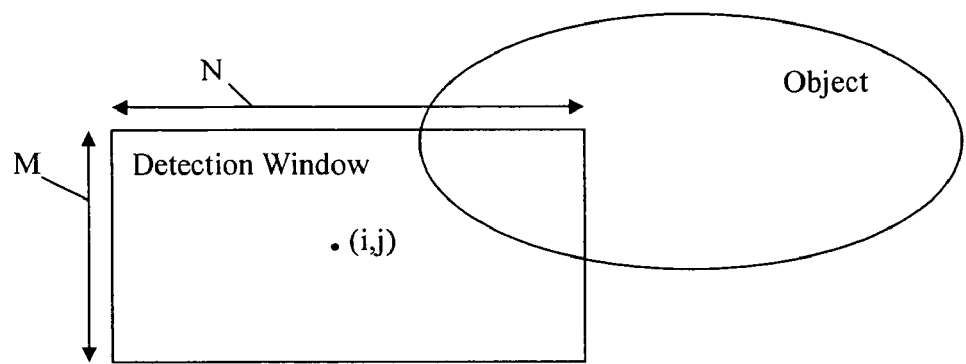
Figure 2
Figure 3
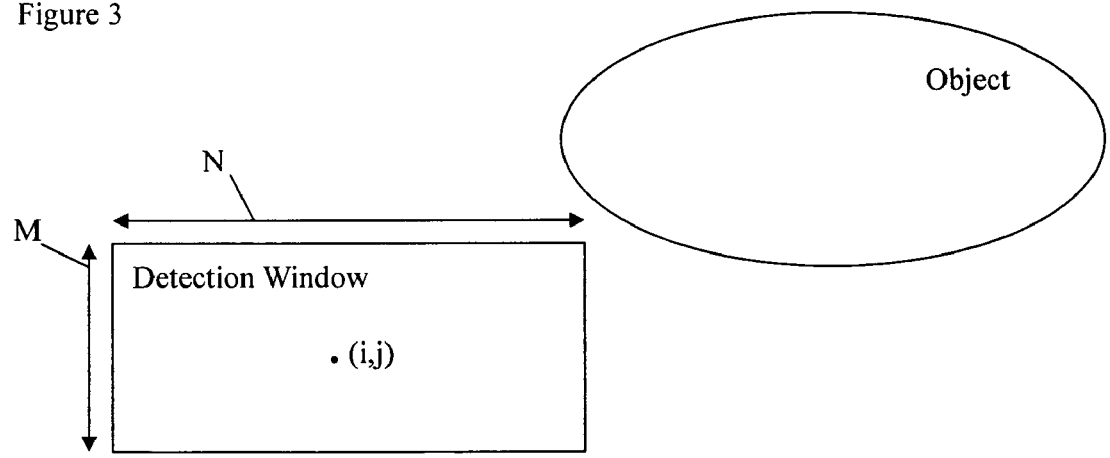

| (i-4,j-6) | (i-4,j-5) | (i-4,j-4) | (i-4,j-3) | (i-4,j-2) | (i-4,j-1) | (i-4,j) | (i-4,j+1) | (i-4,j+2) | (i-4,j+3) | (i-4,j+4) | (i-4,j+5) | (i-4,j+6) | (i-4,j+7) |
|---|---|---|---|---|---|---|---|---|---|---|---|---|---|
| (i-3,j-6) | (i-3,j-5) | (i-3,j-4) | (i-3,j-3) | (i-3,j-2) | (i-3,j-1) | (i-3,j) | (i-3,j+1) | (i-3,j+2) | (i-3,j+3) | (i-3,j+4) | (i-3,j+5) | (i-3,j+6) | (i-3,j+7) |
| (i-2,j-6) | (i-2,j-5) | (i-2,j-4) | (i-2,j-3) | (i-2,j-2) | (i-2,j-1) | (i-2,j) | (i-2,j+1) | (i-2,j+2) | (i-2,j+3) | (i-2,j+4) | (i-2,j+5) | (i-2,j+6) | (i-2,j+7) |
| (i-1,j-6) | (i-1,j-5) | (i-1,j-4) | (i-1,j-3) | (i-1,j-2) | (i-1,j-1) | (i-1,j) | (i-1,j+1) | (i-1,j+2) | (i-1,j+3) | (i-1,j+4) | (i-1,j+5) | (i-1,j+6) | (i-1,j+7) |
| (i,j-6) | (i,j-5) | (i,j-4) | (i,j-3) | (i,j-2) | (i,j-1) | (i,j) | (i,j+1) | (i,j+2) | (i,j+3) | (i,j+4) | (i,j+5) | (i,j+6) | (i,j+7) |
| (i+1,j-6) | (i+1,j-5) | (i+1,j-4) | (i+1,j-3) | (i+1,j-2) | (i+1,j-1) | (i+1,j) | (i+1,j+1) | (i+1,j+2) | (i+1,j+3) | (i+1,j+4) | (i+1,j+5) | (i+1,j+6) | (i+1,j+7) |
| (i+2,j-6) | (i+2,j-5) | (i+2,j-4) | (i+2,j-3) | (i+2,j-2) | (i+2,j-1) | (i+2,j) | (i+2,j+1) | (i+2,j+2) | (i+2,j+3) | (i+2,j+4) | (i+2,j+5) | (i+2,j+6) | (i+2,j+7) |
| (i+3,j-6) | (i+3,j-5) | (i+3,j-4) | (i+3,j-3) | (i+3,j-2) | (i+3,j-1) | (i+3,j) | (i+3,j+1) | (i+3,j+2) | (i+3,j+3) | (i+3,j+4) | (i+3,j+5) | (i+3,j+6) | (i+3,j+7) |
| (i+4,j-6) | (i+4,j-5) | (i+4,j-4) | (i+4,j-3) | (i+4,j-2) | (i+4,j-1) | (i+4,j) | (i+4,j+1) | (i+4,j+2) | (i+4,j+3) | (i+4,j+4) | (i+4,j+5) | (i+4,j+6) | (i+4,j+7) |

Figure 4

| (i-1, j-1) | (i-1, j) | (i-1, j+1) |
|---|---|---|
| (i, j-1) | (i, j) | (i, j+1) |
| (i+1, j-1) | (i+1, j) | (i+1, j+1) |

Figure 6

METHOD AND SYSTEM FOR REDUCING MOSQUITO NOISE IN A DIGITAL IMAGE

FIELD OF THE INVENTION

The present invention generally relates to digital image display methods and systems, and more particularly, to a method and system for reducing mosquito noise in a digital image.

BACKGROUND OF THE INVENTION

Digital display systems, such as digital television systems, often receive and process images in compressed format (e.g., an MPEG standard format). Compressing digital images reduces the overall size of digital image files. However, the processing and display of compressed digital images sometimes results in "mosquito noise" or the blurring of the outlines of objects within these images. Named for its resemblance to the look of mosquitoes flying about the objects of digital images, mosquito noise detracts from the visual effect of compressed pictures. Accordingly, continuing efforts exist to reduce the appearance and effect of mosquito noise in compressed images.

Therefore, it would be desirable to provide a method and system for reducing mosquito noise in a digital image.

SUMMARY OF THE INVENTION

In one embodiment, the present invention provides a method for reducing mosquito noise in a digital image. The method includes receiving an input luminance value for a first pixel in the digital image, and determining whether the first pixel is in relative close proximity to an object appearing in the digital image, based on a comparison of the variation between the input luminance value for the first pixel and luminance values of a first plurality of neighboring pixels. If the first pixel is in relative close proximity to an object, the method performs an average filtering of the input luminance value for the first pixel, based on the luminance values of a second plurality of neighboring pixels, to provide a filtered luminance value for the first pixel.

In another embodiment of the present invention, the present invention provides a method for reducing mosquito noise in a digital image. The method includes selecting a first pixel in the digital image, calculating a maximum variation between the luminance value of the first pixel and the luminance values of a first plurality of neighboring pixels, and determining whether the first pixel is in relative close proximity to an object appearing in the digital image, by comparing the maximum variation to a first threshold value. If the first pixel is in relative close proximity to an object, the method performs adaptive average filtering of the luminance value for the first pixel, based on the luminance values of a second plurality of neighboring pixels, to provide a filtered luminance value for the first pixel.

In another embodiment, the present invention provides a system for reducing mosquito noise in a digital image. The system includes an object detection module that receives an input luminance value for a first pixel in the digital image and determines whether the first pixel is in relative close proximity to an object appearing in the digital image, based on a comparison of the variation between the input luminance value for the first pixel and luminance values of a first plurality of neighboring pixels. The system further includes a filtering module that performs an average filtering of the input luminance value for the first pixel, based on the luminance values of a second plurality of neighboring pixels, to provide a filtered luminance value for the first pixel if the first pixel is determined to be in relative close proximity to an object.

These and other features and advantages of the invention will become apparent by reference to the following specification and by reference to the following drawings.

BRIEF DESCRIPTION OF THE DRAWINGS

FIG. 2 illustrates an example of a spatial relationship between a pixel, a detection window and an object, where a portion of the object resides within the detection window.

FIG. 3 illustrates an example of a spatial relationship between a pixel, a detection window and an object, where the object resides entirely outside the detection window.

FIG. 4 illustrates an example of a pixel and neighboring pixels within a 9×14 detection window.

FIG. 6 illustrates an example of a pixel and neighboring pixels within a 3×3 window used for adaptive averaging, according to one embodiment of the invention.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Figure 1:
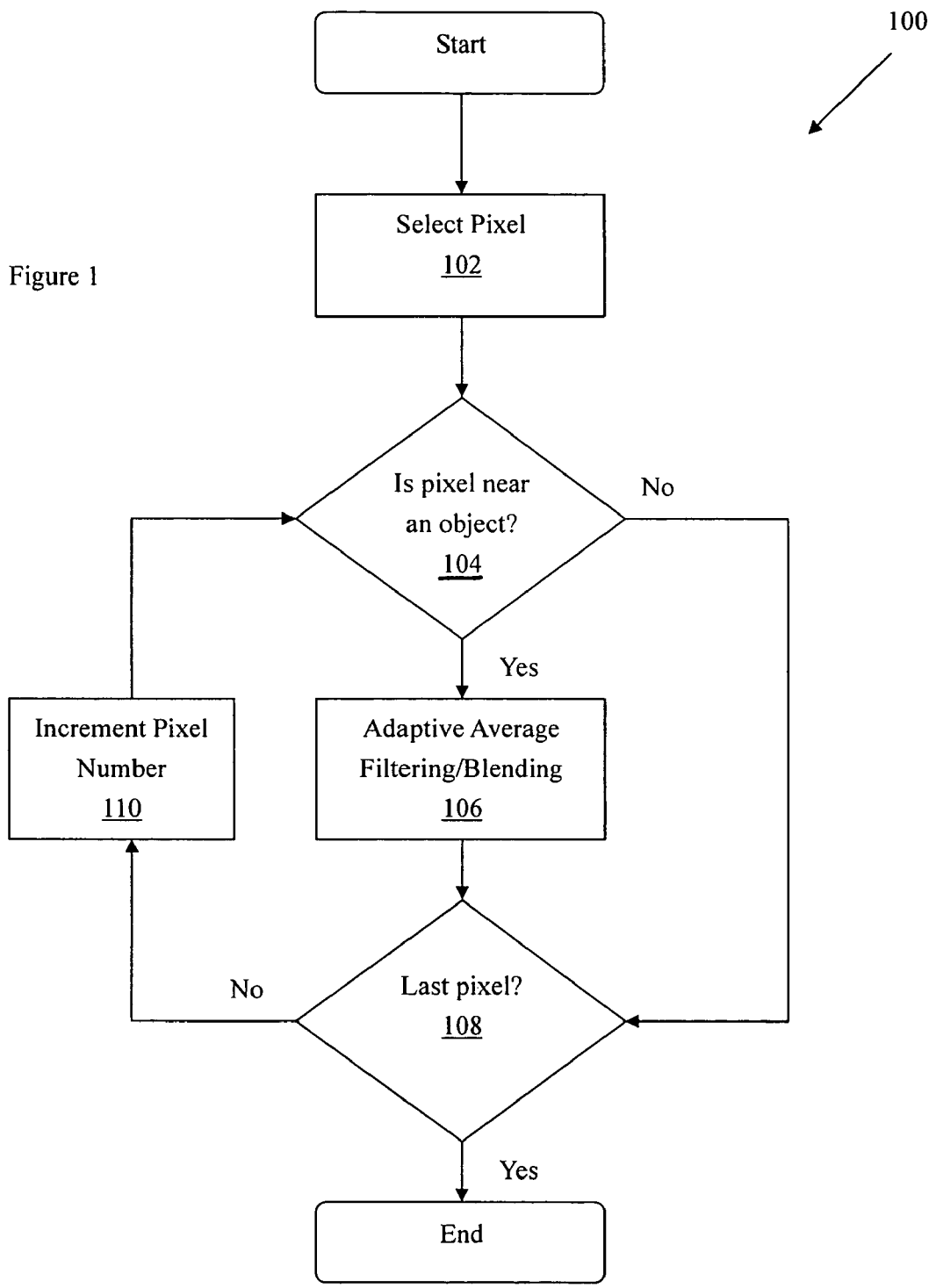
FIG. 1 illustrates an exemplary method for reducing mosquito noise in a digital image, according to one embodiment of the present invention.

FIG. 1 illustrates a general method 100 for reducing mosquito noise in a digital image, according to one embodiment of the present invention. The digital image may include one or more objects that appear over a background. Because mosquito noise typically occurs near objects (e.g., areas of high transition), the method 100 first detects whether the pixel is near an object, or stated conversely, whether an object is near the pixel (e.g., within a predetermined area surrounding a pixel). If the pixel is in relative close proximity to an object (or the transition between an object and background, i.e., an "object transition"), the method 100 selectively filters the pixel. While this embodiment is primarily described in relation to a method 100, it should be appreciated that each of the portions or blocks illustrated in FIG. 1 may represent logic blocks that may be implemented within a digital display system or television chip using conventional hardware, software, or firmware and/or any combination of hardware, software and firmware.

Method 100 begins by selecting a pixel in a digital image, as shown in step 102. The digital image may represent one frame in a sequence of frames that are displayed on a digital display system. The method 100 may be performed on each pixel of each frame that is displayed by the system. In step 104, the method determines whether the pixel is near an object (or whether an object at least partially resides within a predetermined area around the pixel). In one embodiment, the method determines if the pixel is near an object (or near an "object transition") by determining whether an object at least partially resides within a detection window of a predetermined size that surrounds the pixel. In one embodiment, the detection window is generally rectangular with a height of M pixels in the vertical direction and a width of N pixels in the horizontal direction. FIG. 2 illustrates one example of a spatial relationship between a pixel, a detection window and an object, where the object partially resides within the detection window. In contrast, FIG. 3 illustrates an example of a spatial relationship between a pixel, a detection window and an object, where the object resides entirely outside the detection window.

In one embodiment, the method determines whether an object (or object transition) at least partially resides within an M×N detection window surrounding the pixel by examining variations between the luminance value of the current pixel and the luminance values of other pixels in the detection window. More particularly, the method calculates a maximum variation in luminance between the pixels. In one embodiment, the method uses the following equation to calculate a maximum variation value:

$$\text{max\_variation} = \max_{\substack{-\frac{M-1}{2} \leq s \leq \frac{M-1}{2} \\ -\frac{N-1}{2} \leq t \leq \frac{N-1}{2}}} \{\text{abs}(Y(i, j) - Y(i+s, j+t))\}$$

where M is vertical detection range (i.e., the height of the detection window in pixels), N is horizontal detection range (i.e., the width of the detection window in pixels), Y(i,j) is the luminance value of the current pixel (i,j), and s and t are integer values (e.g., s and t may be rounded up to the next highest integer). FIG. 4 illustrates an exemplary detection window of size M, N (where M=9 and N=14), including a pixel (i,j) and its surrounding pixels within the window. It should be appreciated that the size of the window shown in FIG. 4 is merely for exemplary purposes, and that in practice a larger (or smaller) window may be selected.

The maximum variation value may be compared to one or more predetermined values to detect whether an object at least partially resides in the detection window. Large differences between the luminance of pixels within the detection window would signify the presence of a region of high transition (e.g., the transition between an object and background), while small differences typically signify a region of low transition (e.g., background). If the maximum luminance variation is less than the first threshold value TH1, it is assumed that an object is not within the area surrounding the pixel (or that the pixel is not near an object transition). In such case, the method does not filter the pixel and proceeds to step 108.

Figure 5:
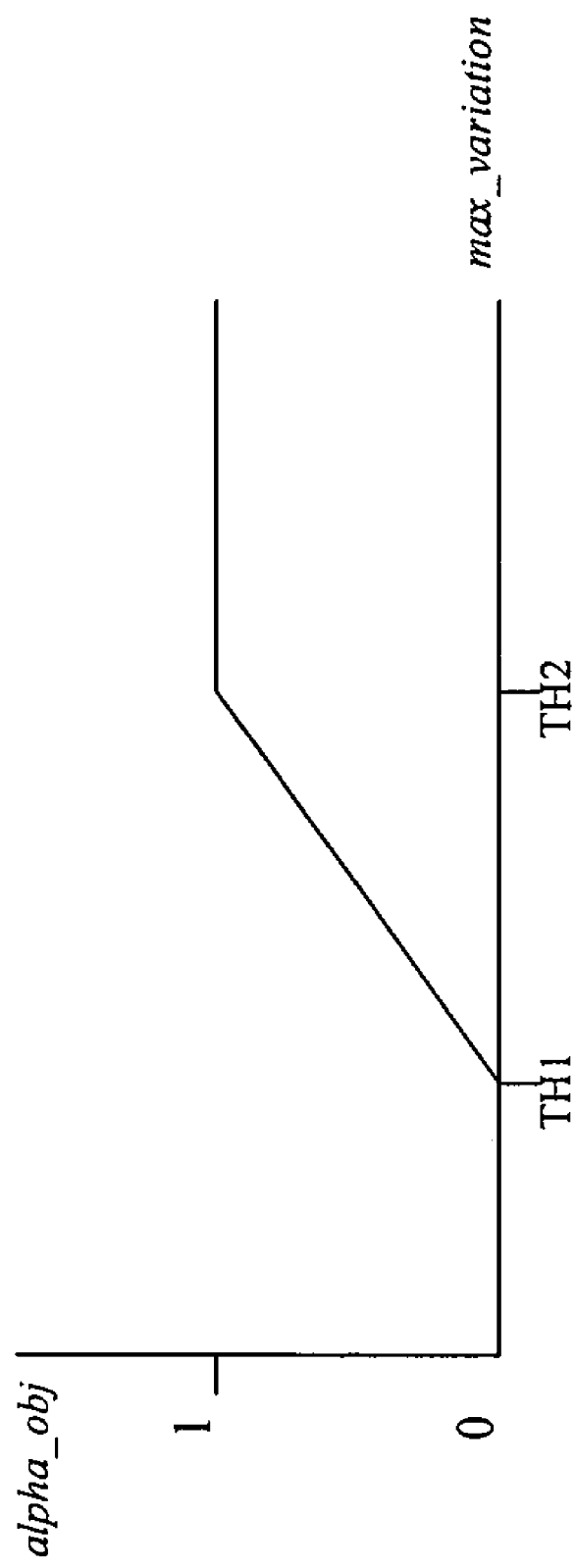
FIG. 5 illustrates one graphical representation of a blending value, alpha_obj, as a function of maximum variation.

If the maximum luminance variation is greater than the first threshold value TH1, it is assumed that an object is within the area surrounding the pixel (or that the pixel is near an object transition). In this case, the pixel is adaptively filtered, as shown in step 106. In one embodiment, method uses first and second threshold values (TH1 and TH2) in order to generate a blending value, alpha_obj, which is used to blend the input luminance value of the pixel and the filtered luminance value of the pixel. FIG. 5 illustrates one graphical representation of a variable alpha_obj value based on the maximum variation. As shown in FIG. 5, if the maximum variation value is greater than the second threshold, it is assumed that the pixel is substantially close to an object transition, and the alpha_obj value is set to 1. In this case, the output value will be equal to the filtered value. If the maximum variation is between the first threshold (TH1) and the second threshold (TH2), then the output luminance value will be a blend between the input luminance value of the pixel and the filtered luminance value of the pixel, according to the following equation:

$$Y''(i,j) = Y'(i,j) \times \text{alpha\_obj}(i,j) + Y(i,j)(1-\text{alpha\_obj}(i,j))$$

where Y''(i,j) is the output luminance for pixel (i,j), Y'(i,j) is the filtered luminance value, Y(i,j) is the input luminance value, and alpha_obj(i,j) is the blending value for pixel (i,j). In one embodiment, the blending value, alpha_obj(i, j) is equal to "0" when the max_variation is less than or equal to TH1, "1" when the max_variation is greater than or equal to TH2, and is equal to a value between 0 and 1 that is based on the max_variation (e.g., proportional to the max_variation), as shown in FIG. 5.

Figure 6:
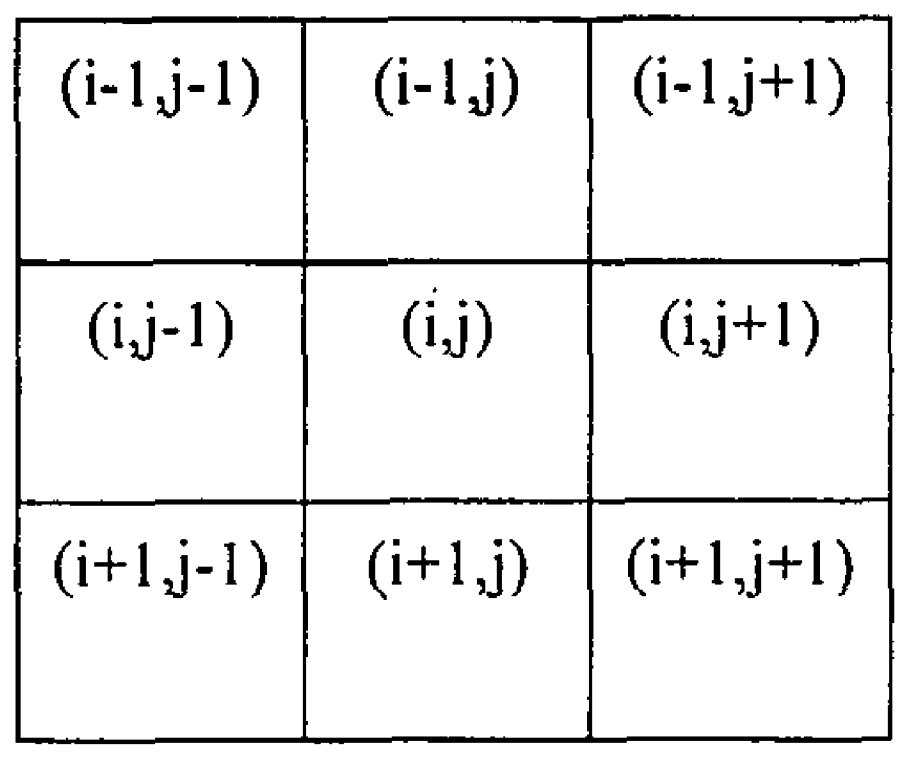

In one embodiment, the filtered luminance value Y'(i,j) is an adaptive average luminance value taken over a series of neighboring pixels surrounding pixel (i,j). In one example, the series of neighboring points includes a 3×3 window around pixel (i,j), as shown in FIG. 6, and the following equation may be used:

$$Y(i,j)' = \frac{1}{8} * [a(i-1,j-1)*(Y(i-1,j-1)-Y(i,j)) + a(i-1,j)*(Y(i-1,j)-Y(i,j)) + \ldots + a(i+1,j+1)*(Y(i+1,j+1)-Y(i,j))] + Y(i,j)$$

where Y(i,j) is the input luminance value for pixel (i,j), and a is correlation between current pixel and surrounding pixels, which may be equal to the following values in one embodiment:

$$a(i+s, j+t) = 1, \text{ when } \text{abs}(Y(i+s, j+t) - Y(i, j)) <= \text{REG\_TH1},$$
$$= 0, \text{ when } \text{abs}(Y(i+s, j+t) - Y(i, j)) >= \text{REG\_TH2}, \text{ and}$$
$$= (\text{REG\_TH2} - \text{abs}(Y(i+s, j+t) - Y(i, j)))/(\text{REG\_TH2} - \text{REG\_TH1}) \text{ for others}$$

value, where REG_TH1 and

REG_TH2 are predetermined threshold values.

In another embodiment, the adaptive average may be taken over an m×n window (i.e., m pixels high by n pixels wide) according to the following equations:

$$Y'(i, j) = \frac{1}{W} \sum_{s=-\frac{n-1}{2}}^{\frac{n-1}{2}} \sum_{t=-\frac{m-1}{2}}^{\frac{m-1}{2}} c(i+s, j+t) \cdot \alpha(i+s, j+t) \cdot Y(i+s, j+t)$$

$$W = \sum_{s=-\frac{n-1}{2}}^{\frac{n-1}{2}} \sum_{t=-\frac{m-1}{2}}^{\frac{m-1}{2}} c(i+s, j+t)$$

$$\alpha(i+s, j+t) = \begin{cases} 1, & \text{abs}(i+s, j+t) \leq \text{REG\_TH1} \\ 0, & \text{abs}(i+s, j+t) \geq \text{REG\_TH2} \\ \frac{\text{REG\_TH2} - \text{abs}(Y(i+s, j+t) - Y(i, j))}{\text{REG\_TH2} - \text{REG\_TH1}}, & \text{others} \end{cases}$$

where c(i,j) is a predetermined coefficient of surrounding pixels, Y(i,j) is the input luminance of pixel (i,j), α (i,j) is a correlation between current pixel and surrounding pixels, REG_TH1, REG_TH2 are predetermined threshold values, and m×n is the filter window size.

Once the method determines the output luminance Y"(i,j), the method proceeds to step 108 and determines whether the current pixel is the final pixel in the frame to be selected. If the pixel is the final pixel of the frame, the method ends. If the pixel is not the final pixel in the frame to be selected, the method proceeds to step 110, where the pixel number is incremented, and then to step 102, where the next pixel is selected. In this manner, the method 100 repeats until each pixel in the frame has been examined for object detection.

In this manner, the method 100 provides object transition detection and corresponding averaging/smoothing of pixels near an object or object transition to substantially reduce or eliminate mosquito noise in a digital image, which typically appears in these areas. One skilled in the art will appreciate that the each of the steps 102 through 110 do not have to occur in the sequence illustrated in FIG. 1. Certain steps may be performed simultaneously on multiple pixels and/or in a different order. Additionally, those skilled in the art will appreciate that the digitized video input and output signals may undergo other conventional filtering and processing operations before display. Furthermore, while the above description illustrates certain methods for carrying out these aspects, it is not an exhaustive list of such methods. For instance, while multiple threshold values are illustrated to provide "blending," the use of a single threshold value may also be used. Different sizes and shapes of detection and averaging windows may be used. Similarly, different criteria and algorithms may be used to detect an object or an object transition. Also, while pixels in relative close proximity to an object or object transition are smoothed according to an adaptive average of surrounding pixels, the invention need not be so limited. It also need not employ an adaptive numerical average, but can instead smooth pixels according to their neighboring pixels in any known fashion.

Figure 7:
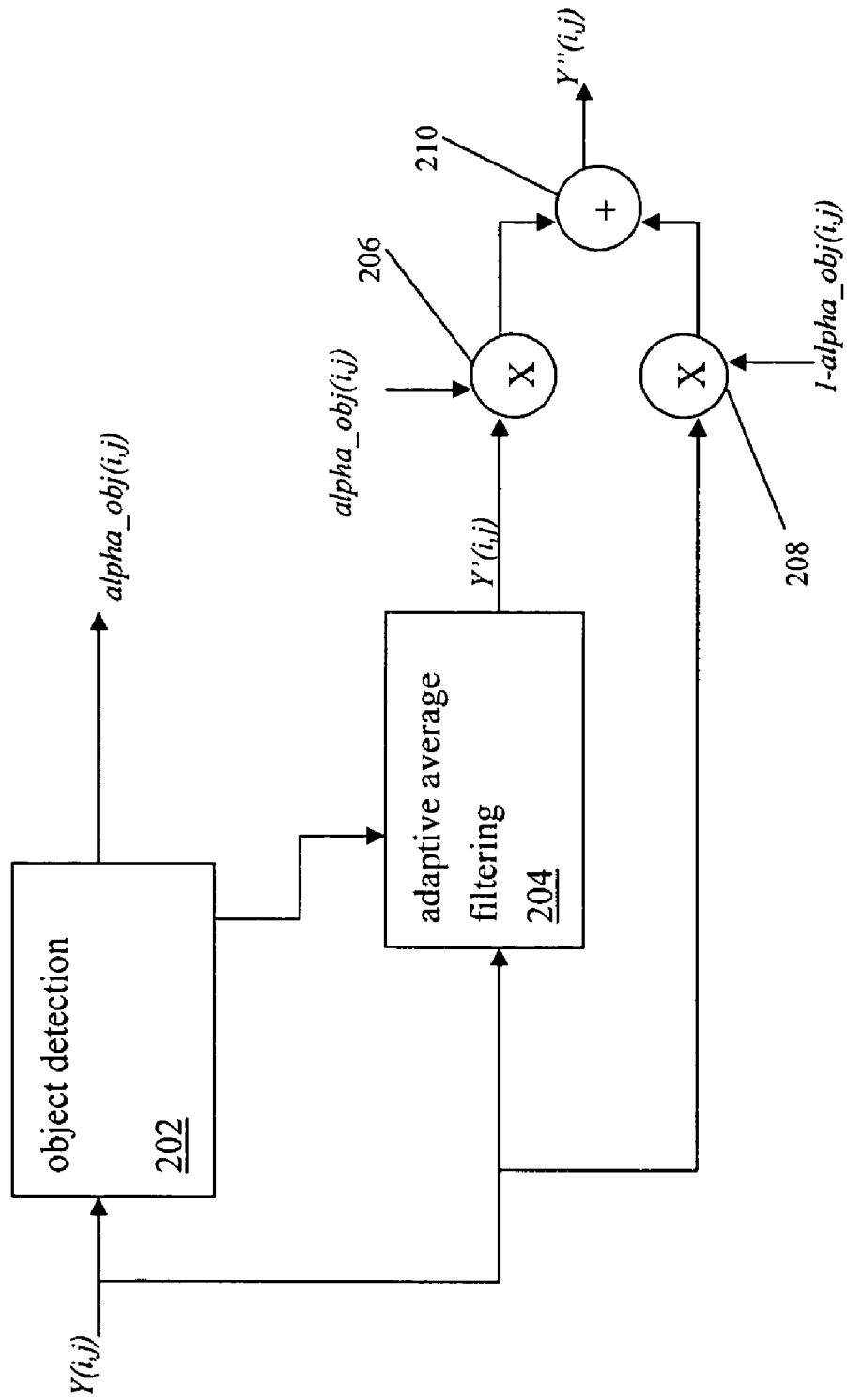
FIG. 7 illustrates a system for reducing mosquito noise in a digital image, according to another embodiment of the present invention.

FIG. 7 illustrates one embodiment of a system 200 that may be used to implement the present invention in a digital display system. In one embodiment, system 200 may reside within or comprise a portion of a display controller or digital television chip. The circuitry shown in FIG. 7 may be formed from conventional hardware elements (e.g., circuits), software elements, firmware elements and/or any combination thereof. In one embodiment, system 200 includes an object detection module or circuit 202, an adaptive average filter module or circuit 204, multiplier blocks 206 and 208, and an adder block 210. Object detection module 202, adaptive average filter module 204, and multiplier 208 are communicatively coupled to and receive input luminance values Y(i,j) for each pixel in a frame. Multiplier block 206 is coupled to and receives a filtered luminance value Y'(i,j) from filter module 204. Multiplier circuits 206 and 208 are coupled to adder 210. It should be appreciated that the system 200 shown in FIG. 6 may also include additional or different circuits or modules. Only those elements useful for an understanding of the invention have been depicted and described. Additionally, those skilled in the art will appreciate that the digitized video signals that provide luminance values may be filtered and processed by other conventional filtering and processing circuitry before display.

The following discussion describes the operation of the system 200 and its components. In operation, the system 200 receives input luminance values Y(i,j) for each pixel in a video frame and generates output luminance values Y"(i,j), which are filtered and/or smoothed to substantially eliminate or reduce mosquito noise. Object detection module 202 determines if the current pixel is near an object or object transition. In one embodiment, object detection module 202 makes this determination by examining variations between the luminance value of the current pixel and the luminance values of all other pixels in an M×N detection window surrounding the pixel, as described above in step 104 of method 100. If an object is detected, detection module 202 may signal the filter module 204 to perform filtering on the pixel. Object detection module 202 may also calculate a blending value for the current pixel, alpha_obj(i,j), according to the same methodology discussed above in reference to FIG. 5.

If an object (or object transition) is detected near the pixel by module 202, filter module 204 calculates an adaptive average luminance value Y'(i,j) over a series of neighboring points around pixel (i,j). In one embodiment, the filtering process performed by module 204 is substantially identical to the process discussed above in step 106 of method 100. The filtered luminance output Y'(i,j) is communicated to multiplier 206. Multipliers 206, 208 and adder 210 perform blending on the filtered value Y'(i,j) using the blending value for that pixel alpha_obj(i,j). Particularly, multiplier 206 multiplies the filtered luminance value Y'(i,j) by the blending value for that pixel alpha_obj(i,j), and multiplier 208 multiplies the input luminance value Y(i,j) by one minus the blending value alpha_obj(i,j). Adder 210 combines these values to generate the output luminance Y"(i,j), which is equal to Y'(i,j)×alpha_obj(i,j)+Y(i,j)(1−alpha_obj(i,j)). The system may then communicate the output luminance value to conventional output circuitry for display on a display device.

From the foregoing, it should be apparent that the embodiments disclosed provide improved methods and systems for mosquito noise reduction in a digital image. The methods and systems substantially eliminate or reduce mosquito noise, which typically appears near objects in a digital image.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for reducing mosquito noise in a digital image, comprising:
   receiving an input luminance value for a first pixel in the digital image;
     determining whether the first pixel is in relative close proximity to an object appearing in the digital image, based on a comparison of the variation between the input luminance value for the first pixel and luminance values of a first plurality of neighboring pixels; and
     if the first pixel is in relative close proximity to an object, performing an average filtering of the input luminance value for the first pixel, based on the luminance values of a second plurality of neighboring pixels different from the first plurality of neighboring pixels, to provide a filtered luminance value for the first pixel.

2. The method of claim 1 wherein the method determines whether the pixel is in relative close proximity to an object by calculating a maximum variation between the luminance value of the first pixel and the luminance values of the first plurality of neighboring pixels.

3. The method of claim 2 wherein the first plurality of neighboring pixels reside within an M×N window surrounding the pixel.

4. The method of claim 3 wherein the first plurality of neighboring pixels reside within an 9×14 window surrounding the pixel.

5. The method of claim 1 further comprising:
   calculating a blending value, based on a comparison of the variation between the luminance value for the first pixel and luminance values of the first plurality of neighboring pixels; and
   determining an output luminance by blending the filtered luminance value for the first pixel and the input luminance value of the first pixel, based on the blending value.

6. The method of claim 5 wherein the blending value is proportional to a maximum variation between the luminance value of the first pixel and the luminance values of the first plurality of neighboring pixels.

7. The method of claim 1 wherein the average filtering is an adaptive average filtering.

8. The method of claim 7 wherein the second plurality of neighboring pixels reside within a 3×3 window surrounding the first pixel.

9. A method for reducing mosquito noise in a digital image, comprising:
   selecting a first pixel in the digital image;
   calculating a maximum variation between the luminance value of the first pixel and the luminance values of a first plurality of neighboring pixels;
   determining whether the first pixel is in relative close proximity to an object appearing in the digital image, by comparing the maximum variation to a first threshold value; and
   if the first pixel is in relative close proximity to an object, performing adaptive average filtering of the luminance value for the first pixel, based on the luminance values of a second plurality of neighboring pixels different from the first plurality of neighboring pixels, to provide a filtered luminance value for the first pixel.

10. The method of claim 9, further comprising:
    comparing the maximum variation to a second threshold value to generate a blending value; and
    determining an output luminance by blending the filtered luminance value for the first pixel and the input luminance value of the first pixel, based on the blending value.

11. The method of claim 10 wherein the output luminance is determined according to the following equation:

$$Y''(i,j)=Y'(i,j)\times\text{alpha\_obj}(i,j)+Y(i,j)(1-\text{alpha\_obj}(i,j))$$

where Y"(i,j) is the output luminance for the first pixel, Y'(ij) is the filtered luminance value, Y(i,j) is the input luminance value and alpha_obj(ij) is the blending value.

12. The method of claim 11 wherein alpha_obj(i,j) is equal to "0" when the maximum variance is less than or equal to the first threshold value, "1" when the maximum variance is greater than or equal to the second threshold value, and otherwise is equal to a value between 0 and 1 that is proportional to the maximum variance.

13. The method of claim 11 wherein the first plurality of neighboring pixels reside within an M×N window surrounding the pixel.

14. The method of claim 11 wherein Y'(ij) is calculated according to the following equations:

$$Y^*(i, j) = \frac{1}{W} \sum_{s=-\frac{n-1}{2}}^{\frac{n-1}{2}} \sum_{t=-\frac{m-1}{2}}^{\frac{m-1}{2}} c(i+s, j+t) \cdot \alpha(i+s, j+t) \cdot Y(i+s, j+t)$$

$$W = \sum_{s=-\frac{n-1}{2}}^{\frac{n-1}{2}} \sum_{t=-\frac{m-1}{2}}^{\frac{m-1}{2}} c(i+s, j+t)$$

$$\alpha(i+s, j+t) = \begin{cases} 1 & , \text{abs}(i+s, j+t) \leq \text{REG\_TH1} \\ 0 & , \text{abs}(i+s, j+t) \geq \text{REG\_TH2} \\ \frac{\text{REG\_TH2} - \text{abs}(Y(i+s, j+t) - Y(i, j))}{\text{REG\_TH2} - \text{REG\_TH1}}, & , \text{others} \end{cases}$$

where c(i,j) is a predetermined coefficient of the second plurality of neighboring pixels, Y(i,j) is the input luminance of pixel (i,j), a (i,j) is a correlation between the first pixel and the second plurality of neighboring pixels, REG_TH1 and REGTH2 are predetermined threshold values, and m×n is a filter window size corresponding to the second plurality of neighboring pixels.

15. A system for reducing mosquito noise in a digital image, comprising:
an object detection module that receives an input luminance value for a first pixel in the digital image and determines whether the first pixel is in relative close proximity to an object appearing in the digital image, based on a comparison of the variation between the input luminance value for the first pixel and luminance values of a first plurality of neighboring pixels; and
a filtering module that performs an average filtering of the input luminance value for the first pixel, based on the luminance values of a second plurality of neighboring pixels different from the first plurality of neighboring pixels, to provide a filtered luminance value for the first pixel if the first pixel is determined to be in relative close proximity to an object.

16. The system of claim 15 wherein the object detection module determines whether the pixel is in relative close proximity to an object by calculating a maximum variation between the luminance value of the first pixel and the luminance values of the first plurality of neighboring pixels.

17. The system of claim 16 wherein the first plurality of neighboring pixels reside within an M×N window surrounding the pixel.

18. The system of claim 15 wherein the object detection module calculates a blending value, based on a comparison of the variation between the luminance value for the first pixel and luminance values of the first plurality of neighboring pixels, and wherein the system further comprising
circuitry for determining an output luminance by blending the filtered luminance value for the first pixel and the input luminance value of the first pixel, based on the blending value.

19. The system of claim 18 wherein the output luminance is determined using the following equation:

$$Y''(i,j) = Y'(i,j) \times \text{alpha\_obj}(i,j) + Y(i,j)(1 - \text{alpha\_obj}(i,j))$$

where Y"(i,j) is the output luminance for the first pixel, Y'(ij) is the filtered luminance value, Y(i,j) is the input luminance value and alphaobj(ij) is the blending value.

20. The system of claim 19 wherein alpha_obj(i,j) is equal to "0" when the maximum variance is less than or equal to the first threshold value, "1" when the maximum variance is greater than or equal to the second threshold value, and otherwise is equal to a value between 0 and 1 that is proportional to the maximum variance.

21. The system of claim 20 wherein Y'(iJ) is calculated according to the following equations:

$$Y^*(i, j) = \frac{1}{W} \sum_{s=-\frac{n-1}{2}}^{\frac{n-1}{2}} \sum_{t=-\frac{m-1}{2}}^{\frac{m-1}{2}} c(i+s, j+t) \cdot \alpha(i+s, j+t) \cdot Y(i+s, j+t)$$

$$W = \sum_{s=-\frac{n-1}{2}}^{\frac{n-1}{2}} \sum_{t=-\frac{m-1}{2}}^{\frac{m-1}{2}} c(i+s, j+t)$$

$$\alpha(i+s, j+t) = \begin{cases} 1 & , \text{abs}(i+s, j+t) \leq \text{REG\_TH1} \\ 0 & , \text{abs}(i+s, j+t) \geq \text{REG\_TH2} \\ \frac{\text{REG\_TH2} - \text{abs}(Y(i+s, j+t) - Y(i, j))}{\text{REG\_TH2} - \text{REG\_TH1}}, & , \text{others} \end{cases}$$

where c(i,j) is a predetermined coefficient of the second plurality of neighboring pixels, Y(i,j) is the input luminance of pixel (i,j), a (i,j) is a correlation between the first pixel and the second plurality of neighboring pixels, REGTH1 and REGTH2 are predetermined threshold values, and m×n is a filter window size corresponding to the second plurality of neighboring pixels.

22. The system of claim 15 wherein the first plurality of neighboring pixels is larger than the second plurality of plurality of neighboring pixels.

23. The system of claim 15 wherein the object detection module and filtering module are operatively disposed within a digital television chip.

* * * * *